March 17, 1959 S. YANDO 2,878,383

CONTROL SIGNAL GENERATOR

Filed Aug. 9, 1956 5 Sheets-Sheet 1

INVENTOR
STEPHEN YANDO
BY Theodore C. Jay Jr.
ATTORNEY

INVENTOR
STEPHEN YANDO
BY Theodore C Jayh
ATTORNEY

INVENTOR
STEPHEN YANDO
BY Theodore C Jay Jr.
ATTORNEY

March 17, 1959 S. YANDO 2,878,383

CONTROL SIGNAL GENERATOR

Filed Aug. 9, 1956 5 Sheets-Sheet 4

INVENTOR
STEPHEN YANDO
BY Theodore C. Jay Jr.
ATTORNEY

March 17, 1959 S. YANDO 2,878,383

CONTROL SIGNAL GENERATOR

Filed Aug. 9, 1956 5 Sheets-Sheet 5

INVENTOR
STEPHEN YANDO
BY Theodore C Jay Jr
ATTORNEY 2,878,383
Patented Mar. 17, 1959

2,878,383

CONTROL SIGNAL GENERATOR

Stephen Yando, Huntington, N. Y., assignor to Sylvania Electric Products Inc., a corporation of Massachusetts Application August 9, 1956, Serial No. 603,070

8 Claims. (Cl. 250—27)

My invention relates to control signal generators.

In my investigations of signal transformation apparatus of the type disclosed in my copending patent applications Serial No. 549,636 filed November 29, 1955, now abandoned and Serial No. 555,943, filed December 28, 1955, I have found it necessary to develop a new type of electronic device for deriving, from an incoming alternating signal, an output signal which is a predetermined function of at least one derivative of the incoming signal. I define such a device as a control signal generator.

Accordingly, it is an object of the present invention to provide a new and improved control signal generator of the character indicated.

Another object is to provide a new and improved control signal generator for deriving, from an incoming alternating signal, an output signal which is a predetermined function of at least one derivative of the incoming signal.

Still another object is to provide a new and improved control signal generator for deriving, from an incoming variable or alternating signal, an output signal which is a predetermined function of a plurality of derivatives of the incoming signal.

Yet another object of the present invention is to improve control signal generators in such manner as to permit the generation of an output signal composed of two or more superimposed components, one of which is of a periodic type, the remaining component or components being predetermined functions of a corresponding derivative or derivatives of an incoming variable or alternating signal.

These and other objects of my invention will either be explained or will become apparent hereinafter.

In accordance with the principles of my invention, I provide one or more differentiation networks, a like number of variable current generators, each of which is coupled at its input to the corresponding differentiation networks, a constant current source, a summation and integration circuit coupled at its input to the outputs of all the current generators and the constant current source, and a clamping device coupled to the output of the summation and integration circuit. An incoming variable or alternating signal is applied in common to the inputs of all the networks. The clamping device is normally inoperative and is rendered operative only when control pulses are supplied to a control input of the device.

When only one network and only one variable current generator are used, the incoming signal is differentiated one or more times in the network to produce a differentiated signal which represents the first, second or higher derivative of the incoming signal.

The generator derives from the differentiated signal a control current which during any instant of time is proportional to the absolute value of the differentiated signal during this interval.

The control current and the constant current yielded by the source are both supplied to the summation and integration circuit, wherein both currents are added together and integrated to produce an output or control signal. The clamping device is rendered operative, at discretely spaced times and, at such times, causes the output signal to attain one fixed value, as for example, zero.

As a result, the output signal contains two superimposed components. The first component is proportional to the integrated value of the control current. Due to the clamping action, the second component, which is proportional to the integrated value of the constant current, has a sawtooth wave form.

When a N plurality of different networks (where N is any positive integer) and a like plurality of current generators are used, each of the networks yields a differentiated signal which represents a different one of N derivatives of the incoming signal. Each generator then produces a different control current which during any interval is proportional to the absolute value of the corresponding differentiated signal during this interval, and thus N different control currents are produced. All these control currents together with the constant current, are added together and integrated in the manner previously described to produce the output signal.

In this situation, however, the output signal contains $(N+1)$ superimposed components. One component as before has a sawtooth wave form and is proportional to the integrated value of the constant current. Each of the remaining N components is proportional to the integrated value of the corresponding control current.

In certain applications, I have found it necessary to prevent any of the control currents from being supplied to the integration and summation circuit during predetermined intervals of time, and yet at the same time permit the constant current to be supplied to the circuit. Thus, during these intervals, the output signal contains only the component having the sawtooth wave form. Further, it has been found necessary to vary the output signal during these intervals so that the only component retains its sawtooth wave form but with a changed slope and a different maximum value. This action is accomplished by inserting a normally open gate between the control generator or generators and the integration and summation network. This gate, when open, permits the multi-component containing signal to be generated and, when closed, prevents passage of the control current or currents into the integration and summation networks. The constant current output of the constant current source is either increased or decreased during the intervals in which the gate is closed, thus modifying the slope and magnitude of the sawtooth component as previously indicated.

Occasionally, I have found it necessary to prevent the constant current from being supplied to the integration and summation circuit during predetermined intervals of time and yet at the same time permit the control current or currents to be supplied to the circuit. Thus, during the intervals, the output signal contains only the component or components proportional to the integrated value or values of the control current or currents. By inserting a normally open gate between the constant current source and the integration and summation circuit and controlling the gating action in the manner indicated in the preceding paragraph, this result can be obtained.

Illustrative embodiments of my invention will now be described in detail with reference to the accompanying drawings, wherein Fig. 1 illustrates such one embodiment of my invention in block form;

Figure 1:
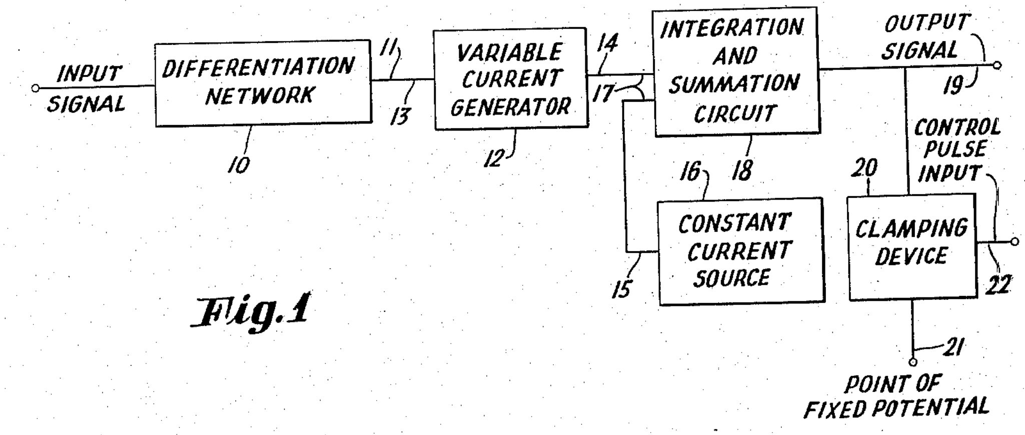

Referring now to Fig. 1, the output 11 of a differentiation network 10 is coupled to the input 13 of a variable control current generator 12. The output 14 of generator 12 and the output 15 of a constant current source 16 are coupled to the input 17 of a summation and integration circuit 18. A clamping device 20 is coupled to the output 19 of circuit 18.

Figure 2:
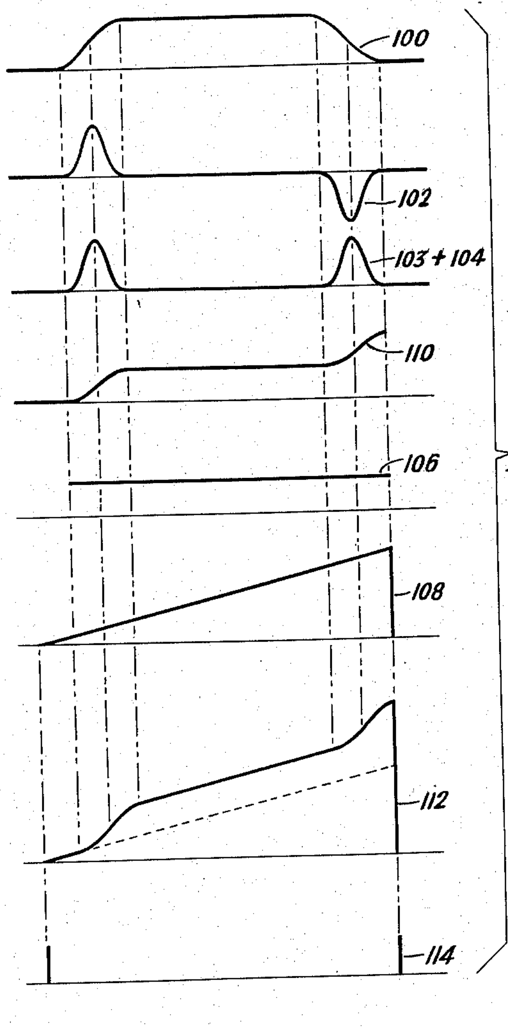
Fig. 2 is a plot of the wave forms of the various signals and currents utilized in the apparatus shown in Fig. 1.

An incoming alternating signal which in this example as shown in Fig. 2 is a video type signal having direct current and alternating current components, is differentiated N times in network 10 to produce a signal proportional to the Nth derivative of the incoming signal where N is any positive integer. In this example, as will be more apparent from the discussion of Fig. 2, this signal is proportional to the first derivative of the incoming signal ($N=1$). The differentiated signal is supplied to generator 12 which derives therefrom a control current proportional to the absolute value of the differentiated signal. This control current and a constant output current yielded by the source 16 are summed and integrated by circuit 18 to produce the desired output signal at the output 19 of this circuit. The clamping device 20 responds to incoming discretely spaced apart control pulses supplied to its control pulse input 22 to clamp the output signal to some point of fixed potential 21, and thus establish a fixed signal level, as for example zero during clamping. In the absence of such control pulses, device 20 is inoperative and the output signal varies as desired.

The wave forms of all these signals, pulses, and currents are shown in Fig. 2, wherein 100 identifies the video signal, 102 identifies the differentiated signal, 103 identifies the absolute value of the differentiated signal, 104 identifies the control current (103 and 104 have the same wave form), 106 identifies the constant current, 108 identifies the integrated constant current, 110 identifies the integrated control current, 112 identifies the output signal, and 114 identifies the control pulses.

A constant current when integrated increases linearly with time. Since during clamping, the output signal level is established at some fixed potential, as for example zero, the combined clamping and integration operations on the constant current output (shown at 106) from source 16 produce an output signal first component having a sawtooth wave form as shown at 108.

The control current shown at 104, being proportional to the absolute value of the differentiated signal (shown at 103), increases and decreases but always retains the same polarity. When integrated, therefore, the control current has the wave form indicated at 110 and thus produces a second component of the output signal having this wave form.

Due to the summation or additive action of circuit 18, these two components shown at 108 and 110 respectively are added together to produce the output signal shown at 112.

Figure 3:
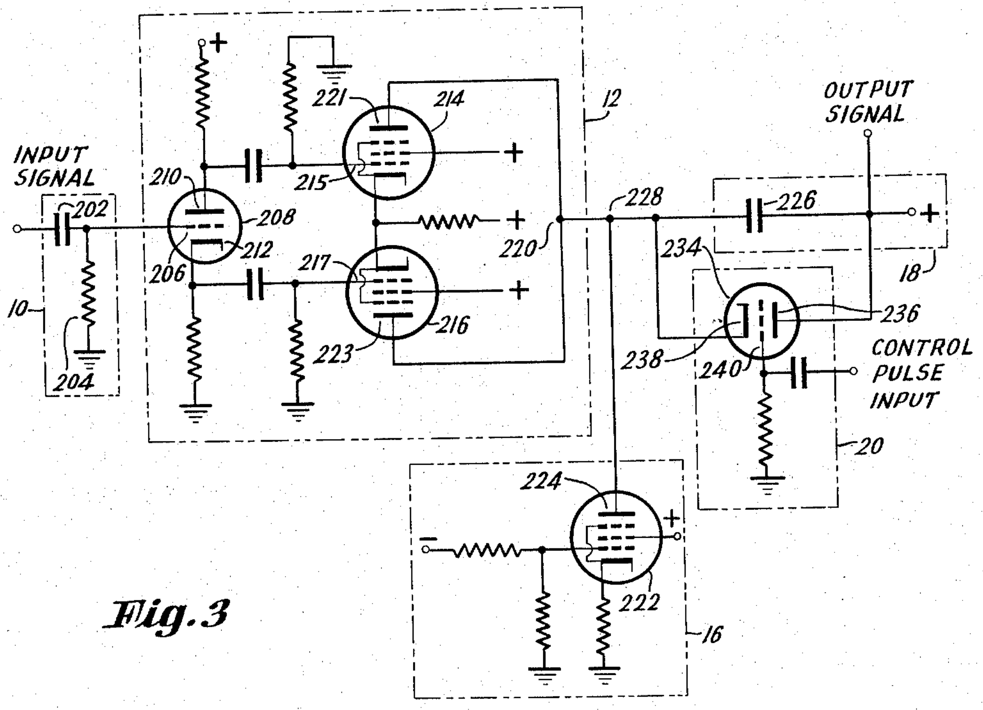
Fig. 3 is a schematic diagram of the system shown in Fig. 1.

Fig. 3 shows a schematic diagram of apparatus which functions in the manner shown in Figs. 1 and 2. The differentiation network 10 is composed of capacitor 202 and resistor 204. The differentiated signal appearing across resistor 204 (which is, as indicated, the first derivative) is then supplied to the input of the control current generator 12 which as shown here comprises tubes 208, 214 and 216.

Figure 4:
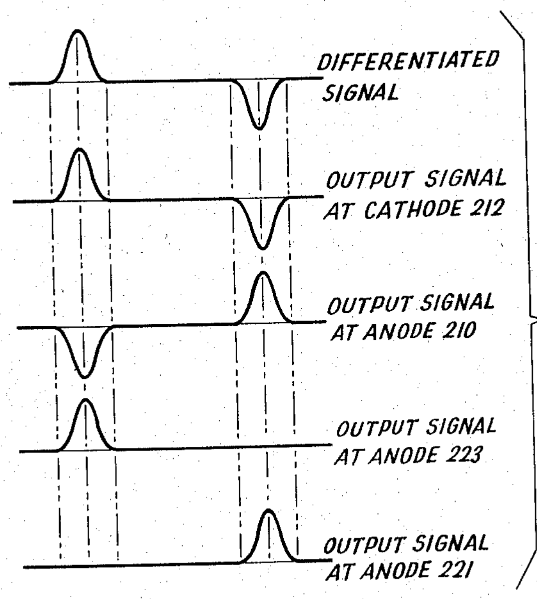
Fig. 4 is a plot of the wave forms of the various signals and currents utilized in the apparatus shown in Fig. 3.

Tube 208 functions in conventional manner as a paraphase amplifier, yielding at its anode 210 a differentiated output signal which is 180° out of phase with the differentiated output signal produced at its cathode 212 (as shown in Fig. 4) where the differentiated signal is supplied to its control grid 206. These two differentiated signals are respectively supplied to the control grids 215 and 217 of pentodes 214 and 216 respectively.

Each of these pentodes 214 and 216 is biased in conventional manner to permit each pentode to be rendered conductive upon only the presence of a positive going signal at its corresponding control grid.

As is well known, when the anode potential of a pentode exceeds its screen grid potential, the pentode effectively acts as a constant current generator, the current produced in its output being proportional to the potential applied between its control grid and cathode.

The output currents from both pentodes are combined at 220. Since the signals supplied to the grids of pentode 214 and pentode 216 are opposed in phase, and since each of these pentodes only conducts when the appropriate signal is positive, the combined output or control current is proportional at any time to the absolute value or magnitude of the differentiated signal at this time.

The constant current source 16 is shown as a third pentode tube 222. Tube 222 is biased at a constant potential so that it is always conductive and produces a constant current appearing at the anode 224 of tube 222.

The anodes 221, 223, and 224 of pentodes 214, 216, and 222 are coupled through a capacitor 226 to a point of positive potential. Capacitor 226 represents the summation and integration circuit. The desired output signal appears at the junction 228 of the anodes 221, 223, 224 and the capacitor 226.

A triode tube 234 representing the clamping device 20, is connected in shunt across capacitor 226, the anode 236 of the triode being connected to the point of positive potential. This triode is normally non-conductive (the cathode 238 of this tube being usually at a much higher positive potential than the control grid 240) and is rendered conductive and clamps the output signal only upon the appearance of positive going control pulses at its grid 240.

To assist in an understanding of the apparatus shown in Fig. 3, wave forms of the signals and currents utilized by the various portions of the current generator shown schematically in Fig. 3, are plotted as shown in Fig. 4. The wave forms utilized by the other circuit components are identical with those shown in Fig. 2.

Figure 5:
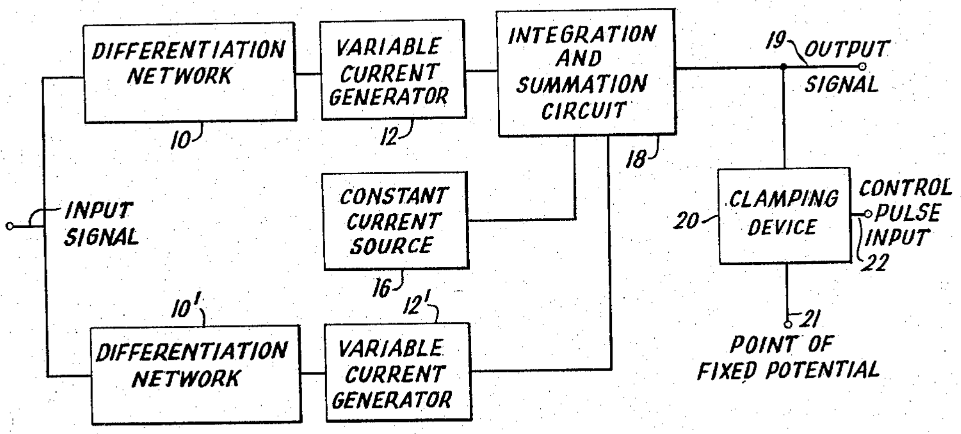
Fig. 5 is a block diagram of a second such embodiment.

Referring now to Fig. 5, there is shown apparatus which includes the elements of Fig. 1 and further includes a second differentiation network 10' and a second variable current generator 12'. The output 11' of network 10' is coupled to the input 13 of generator 12' and the output 14' of generator 12' is coupled to the input of the summation and integration circuit 18.

The incoming signal is supplied both to the input 11 of network 10 and the input 11' of network 10'. The differentiated signal yielded at the output of network 10 is as before proportional to a selected one of N derivatives of the incoming signal, i. e. in this example, the first derivative, while the differentiated signal yielded at the output of network 10' is proportional to a different selected derivative, the second derivative.

Figure 6:
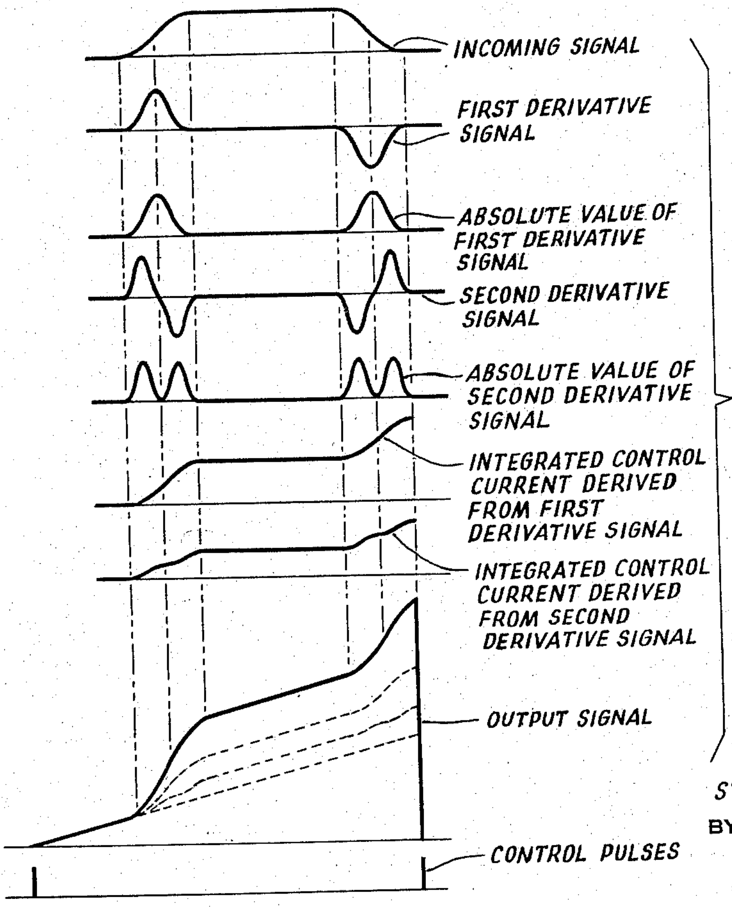
Fig. 6 is a plot of the wave forms of the various signals and currents utilized in the apparatus shown in Fig. 5.

Generator 10 then yields, as before, a first control current which is proportional to the absolute value of the first derivative signal, and generator 10' then yields a second control current which is proportional to the absolute value of the second derivative signals. The control currents and the constant current are summed and integrated in the manner indicated to produce an output signal. In this example, however, the control signal has three superimposed components, the first and second of which correspond to the two components produced by the apparatus of Fig. 1. The third component is proportional to the integrated value of the second control current. The appropriate wave forms for the apparatus of Fig. 5 are shown in Fig. 6. The constant current and integrated constant current wave forms are not shown, being identical with those shown in Fig. 2.

It will be obvious that by adding additional differentiation networks and variable current generators to the apparatus of Fig. 5, in such manner that each additional network is responsive to the incoming signal, each network being coupled to its corresponding generator and the outputs of all generators being coupled to the input of the circuit 18, an output signal can be produced which contains $(N+1)$ components. One of these components as before will have a sawtooth wave form and each of the remaining N components will be proportional to the integrated value of the corresponding control current.

Figure 7:
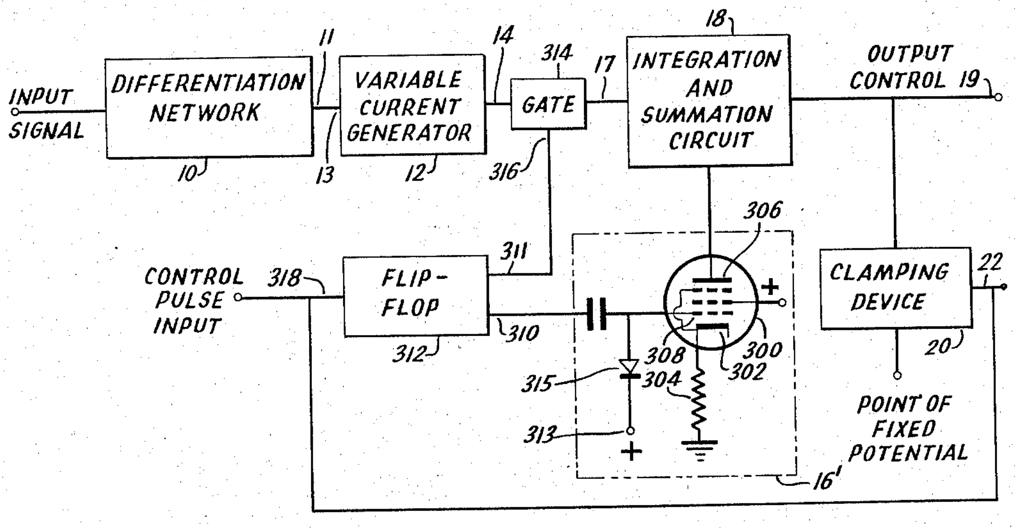
Fig. 7 is a partially block and partially schematic diagram which represents a modification of the apparatus shown in Fig. 1.

Fig. 7 shows apparatus which includes the elements of Fig. 1. However, in Fig. 7 a conventional gate or as it is sometimes known a gated amplifier 314 (for example of the type described in "Electronic and Radio Engineering," fourth edition, by Frederick E. Terman, pages 659 ff.) is interposed between the output of the generator 14 and the input of the circuit 18; further, a different constant current source 16′ is utilized in place of the source 16 shown in Fig. 1.

The current source comprises a pentode 300 having its cathode 302 grounded through a cathode resistor 304 and its anode 306 coupled to the input of the circuit 18 in the general manner illustrated in Fig. 3. The control grid 308 of pentode 300, however, is capacitively coupled to one output 310 of a flip-flop or bistable multivibrator 312 and is further connected to a point of positive potential 313 through a diode 315.

A second output 311 of the flip-flop is also coupled to the control input 316 of gate 314.

Control pulses supplied to clamping device 18 in the manner described in Fig. 1 are also supplied to the input 318 of the flip-flop.

Upon the arrival of a first control pulse, the flip-flop is set, yielding at output 311, a voltage which opens gate 314 and, at output 310, a voltage which causes diode 315 to conduct. As a result of this diode conduction, the pentode 300 is biased to produce a constant current in the manner shown in Fig. 1. Since control current passes through the gate when it is open or conductive, the apparatus of Fig. 7 then functions in the manner shown in Fig. 1. An output signal having two components is produced in the manner indicated.

Figure 9A:
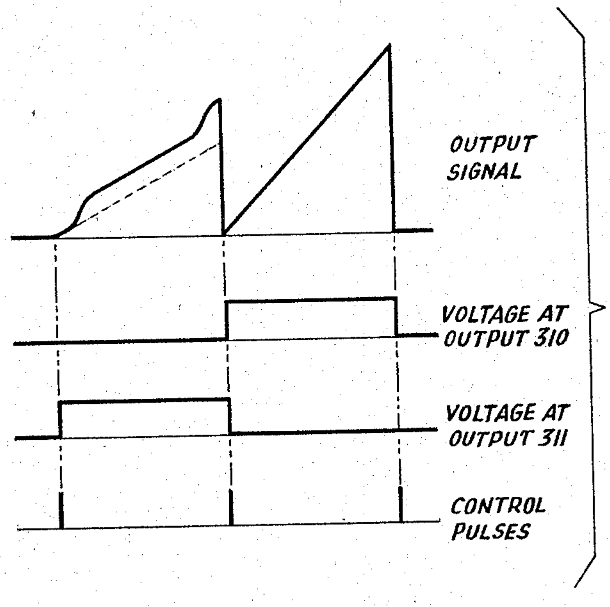
Figs. 9*a* and 9*b* are plots of the wave forms of the various signals and currents utilized in the apparatus shown in Fig. 7 and Fig. 8.

Upon the arrival of the second control pulse, however, the flip-flop is reset, yielding at output 311 a voltage which closes gate 314, and at output 310 a voltage which is more positive than the potential of point 313 and renders diode 315 non-conductive. Since the gate is closed, no control current can be supplied to the circuit 18. However, the pentode is biased more positively when diode 315 is cut off than when it is conducting; a constant current of greater magnitude than that used in Fig. 1 is produced. The output signal, under these conditions, contains only the component proportional to the integrated constant current and has a sawtooth wave form as before, but the slope of the signal is sharper and the maximum magnitude of the signal is larger than the slope and magnitude of the corresponding component of Fig. 1. The appropriate wave forms for the apparatus of Fig. 7 are shown in Fig. 9*a*.

Figure 8:
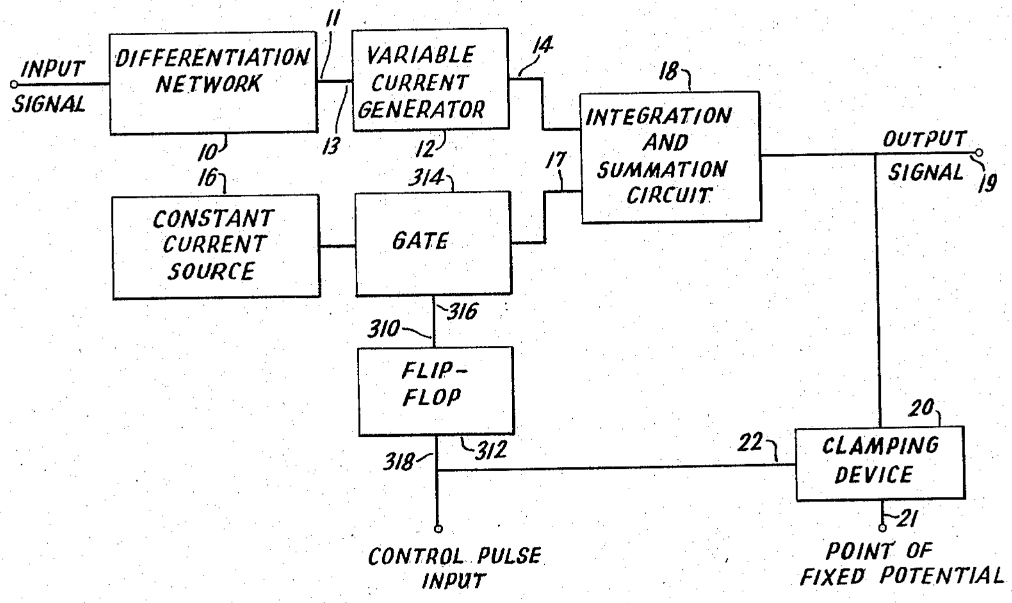
Fig. 8 is a block diagram which represents a modification of the apparatus shown in Fig. 7.

The apparatus of Fig. 7 can be readily modified as shown in Fig. 8 so as to produce an output signal which, during certain intervals, is identical with that produced by the apparatus of Fig. 1 and during other intervals, contains all components other than the component proportional to the integrated constant current.

In such a modification, the source 16 of Fig. 1 is substituted for the source 16′. Further, the output 310 of the flip-flop 312 is disconnected, and gate 314 is removed from the position shown in Fig. 7 and instead is interposed between the output of source 16 and the input of the circuit 18.

Figure 9B:
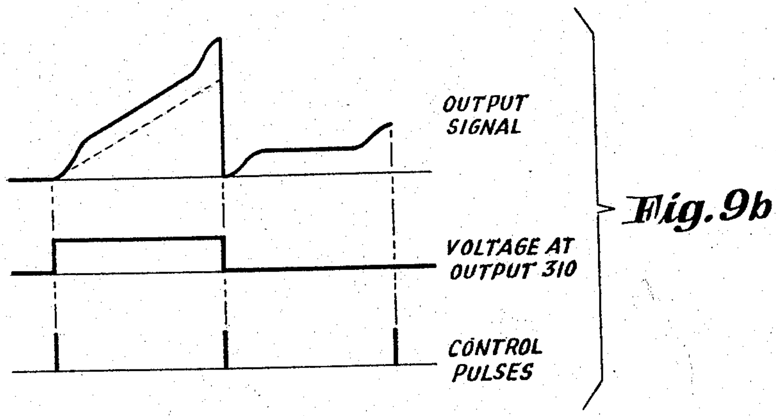

The gating sequence of the apparatus shown in Fig. 8 is identical with that shown in Fig. 7. When gate 314 of Fig. 9 is open, the output signal is identical with that produced in Fig. 1. However, when this gate is closed, the constant current is not supplied to the circuit 18, and the output signal contains only the component or components proportional to the integrated control current or currents. The appropriate wave forms for the apparatus of Fig. 8 are shown in Fig. 9*b*.

While I have shown and pointed out my invention as applied above, it will be apparent to those skilled in the art that many modifications can be made within the scope and sphere of my invention as defined in the claims which follow.

What is claimed is:

1. A control signal generator comprising first means responsive to an incoming variable signal to derive therefrom a plurality of differentiated signals, each differentiated signal being proportional to a different selected one of N derivatives of the incoming signal, N being any positive integer; second means responsive to said plurality of differentiated signals to derive therefrom a like plurality of control currents, each control current being proportional during any interval to the absolute value of the corresponding differentiated signal during said any interval; third means to produce a constant current; fourth means to sum together and integrate all of said control currents and said constant current to produce a resultant output signal; and fifth means coupled to said fourth means and actuated at predetermined discrete intervals to establish a fixed reference level for said output signal during said predetermined intervals, said fifth means being otherwise deactuated.

2. In combination, a plurality of differentiation networks; a like plurality of control current generators, the input of each generator being coupled to the output of the corresponding network, the outputs of all said generators being interconnected; a constant current source; a summation and integration circuit coupled at its input to the output of said source and the interconnected outputs of said generators; and a clamping device coupled to the output of said circuit, said device being actuated at predetermined discrete intervals and being otherwise deactuated.

3. A method for deriving, from a constant current source and an incoming variable signal, an output signal having a plurality of superimposed signal components, one of said components having a sawtooth wave form, each of the remaining components being proportional to the integrated value of a corresponding control current, each control current being proportional to the absolute value of a different selected one of N derivatives of said incoming signal, N being any positive integer, said method comprising the steps of differentiating said incoming signal to produce a plurality of differentiated signals equal in number to the number of said remaining components, each differentiated signal being proportional to the corresponding selected derivative of said incoming signal; deriving, from said plurality of differentiated signals, a like plurality of control currents, each control current during any interval being proportional to the absolute value of the corresponding differentiated signal during said any interval; summing said plurality of control currents and a constant current yielded by said source; integrating said summed currents to produce a resultant signal; and establishing a fixed level for said resultant signal at predetermined discrete intervals whereby said resultant signal becomes said output signal.

4. In combination, first and second constant current generators, the outputs of both generators being interconnected in parallel, means to supply first and second incoming variable signals opposed in phase but otherwise identical to the inputs of said first and second generators respectively, each generator including means to render said generator operative only when the corresponding incoming signal positively exceeds zero, whereby said generator yields an output current proportional to its positive going signal and the output current appearing in said interconnected outputs is proportional to the absolute value of either of said incoming signals and means to integrate said output current, said means being coupled to the interconnected outputs of said generators.

5. The combination as set forth in claim 4 wherein each generator includes a pentode provided with an anode and an input circuit, the anodes of said tubes being interconnected.

6. The combination as set forth in claim 4 wherein said integrating means includes a capacitor coupled between the interconnected outputs of said generator and a point of positive potential.

7. The combination as set forth in claim 4 wherein each generator includes a pentode provided with an anode and an input circuit, the anodes of said tubes being interconnected, and wherein said integrating means includes a capacitor coupled between said interconnected anodes and a point of positive potential, the input circuit of each tube being biased to render said tube operative only when the incoming signal positively exceeds zero.

8. A control signal generator comprising first means responsive to an incoming variable signal to derive therefrom a plurality of differentiated signals, each differentiated signal being proportional to a different selected one of N derivatives of the incoming signal, N being any positive integer; second means responsive to said plurality of differentiated signals to derive therefrom a like plurality of control currents, each control current being proportional during any interval to the absolute value of the corresponding differentiated signal during said any interval; and fourth means to sum together and integrate all of said control currents to produce a resultant output signal.

References Cited in the file of this patent

UNITED STATES PATENTS

| | | |
|---|---|---|
| 2,647,209 | Krause | July 28, 1953 |
| 2,678,389 | Loughlin | May 11, 1954 |